(12) United States Patent
Manning et al.

(10) Patent No.: US 6,607,356 B2
(45) Date of Patent: Aug. 19, 2003

(54) CROSSOVER COOLED AIRFOIL TRAILING EDGE

(75) Inventors: Robert Francis Manning, Newburyport, MA (US); Mohammad Esmail Taslim, Needham, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/044,249

(22) Filed: Jan. 11, 2002

(65) Prior Publication Data

US 2003/0133795 A1 Jul. 17, 2003

(51) Int. Cl.[7] ................................................. F01D 5/18
(52) U.S. Cl. ........................................................ 416/97 R
(58) Field of Search ............................... 415/115, 116, 415/177, 178; 416/97 R, 96 R

(56) References Cited

U.S. PATENT DOCUMENTS

| 4,474,532 A | 10/1984 | Pazder | 416/97 R |
|---|---|---|---|
| 4,752,186 A * | 6/1988 | Liang | 416/97 R |
| 4,775,296 A | 10/1988 | Schwarmann et al. | 416/97 R |
| 5,395,212 A | 3/1995 | Anzai et al. | 416/97 R |
| 5,700,132 A | 12/1997 | Lampes et al. | 416/97 R |
| 6,174,134 B1 | 1/2001 | Lee et al. | 416/97 R |
| 6,234,754 B1 * | 5/2001 | Zelesky et al. | 416/97 R |

* cited by examiner

*Primary Examiner*—Edward K. Look
*Assistant Examiner*—Richard A. Edgar
(74) *Attorney, Agent, or Firm*—Nathan D. Herkamp; Francis L. Conte

(57) ABSTRACT

A turbine airfoil includes pressure and suction sidewalls having first and second flow channels disposed therebetween and separated by a longitudinally extending bridge. The bridge includes a row of inlet holes, and a row of outlet holes extends from the second channel toward the trailing edge of the airfoil. A row of turbulator ribs is disposed inside the second channel along the pressure sidewall and are longitudinally elongate and substantially colinear. The ribs face the inlet holes for crossover impingement cooling from the air channeled therefrom.

22 Claims, 4 Drawing Sheets

CROSSOVER COOLED AIRFOIL TRAILING EDGE

BACKGROUND OF THE INVENTION

The present invention relates generally to gas turbine engines, and, more specifically, to turbine blade cooling therein.

In a gas turbine engine, air is pressurized in a compressor and mixed with fuel in a combustor and ignited for generating hot combustion gases. Energy is extracted from the combustion gases in turbines disposed downstream therefrom. A high pressure turbine powers the compressor, and a low pressure turbine powers a fan in a typical turbofan aircraft engine application.

Each turbine stage includes a stationary turbine nozzle having a row of vanes which direct the combustion gases to a cooperating row of turbine rotor blades. The vanes and blades are typically hollow and provided with air bled from the compressor for cooling the vanes and blades during operation.

Turbine vane and blade cooling art is quite crowded with a myriad of cooling configurations found therein specifically configured for cooling the various portions of the airfoils defining the vanes and blades. Each airfoil has a generally concave pressure side and an opposite generally convex suction side extending axially between leading and trailing edges and radially in span from an inner root to an outer tip.

In view of the three dimensional complex combustion gas flow distribution over the airfoils, the different portions thereof are subjected to different heat loads during operation. The heat, in turn, generates thermal stress in the airfoils which must be suitably limited for prolonging the life of the airfoil.

The airfoils are typically manufactured from superalloy cobalt or nickel based materials having sustained, strength under high temperature operation. The useful life of the airfoils is limited by the maximum stress experienced therein irrespective of its particular location in the airfoil.

Accordingly, the prior art includes various forms of internal cooling channels having various forms of heat transfer increasing turbulator ribs or pins therein for cooling the various portions of the airfoil with different effectiveness.

For example, U.S. Pat. No. 6,174,134—Lee et al, assigned to the present assignee, discloses a multiple impingement airfoil cooling configuration for effecting enhanced cooling in a trailing edge region of a turbine blade. However, that turbine airfoil is specifically configured for a relatively large turbofan engine and, correspondingly, the turbine airfoil itself is relatively large. The trailing edge cooling configuration disclosed in this patent has particular utility in the large airfoil size, with Reynolds numbers greater than about 30,000 for the impingement air directed against the pressure side trailing edge turbulators disclosed therein.

The assignee is developing another, smaller gas turbine engine having correspondingly smaller turbine blades which are not amenable to the cooling configuration disclosed in the Lee et al patent. Turbine airfoil cooling features are not readily scaled down in size from large turbine blades to small turbine blades in view of the inherent nature of heat transfer characteristics.

For example, attempting to scale down the configuration of the Lee et al patent in a smaller turbine airfoil would result in a Reynolds number for the impingement cooling air in a trailing edge cavity of substantially less than the 30,000 effected in the large airfoil. Correspondingly, insufficient heat transfer would be available for adequately cooling the small airfoil using the configuration of the larger Lee et al large airfoil.

Accordingly, it is desired to provide an improved impingement cooling configuration for the trailing edge region of relatively small turbine blade airfoils.

BRIEF SUMMARY OF THE INVENTION

A turbine airfoil includes pressure and suction sidewalls having first and second flow channels disposed therebetween and separated by a longitudinally extending bridge. The bridge includes a row of inlet holes, and a row of outlet holes extends from the second channel toward the trailing edge of the airfoil. A row of turbulator ribs is disposed inside the second channel along the pressure sidewall and are longitudinally elongate and substantially colinear. The ribs face the inlet holes for crossover impingement cooling from the air channeled therefrom.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
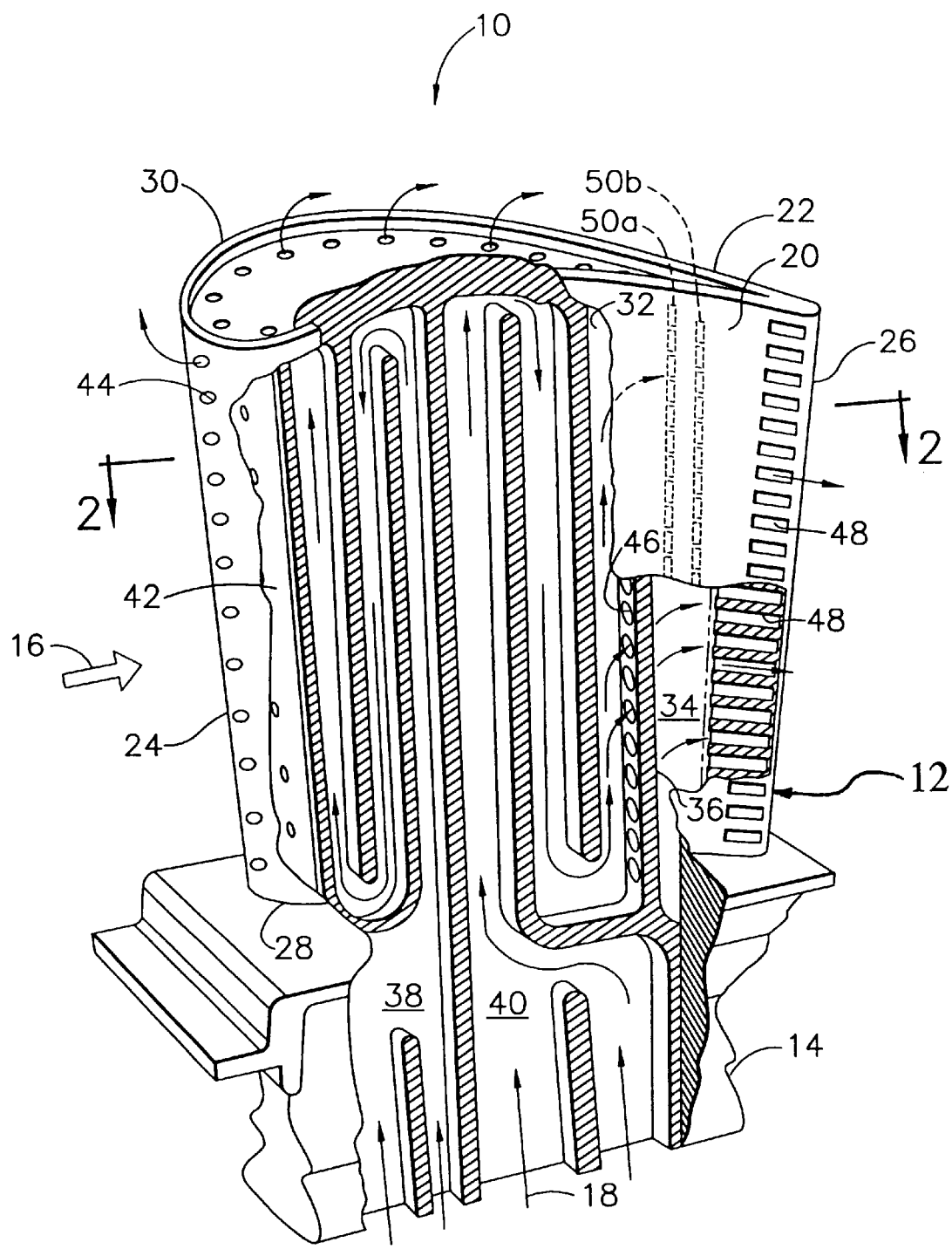
FIG. 1 is an isometric, partly cutaway view of an exemplary gas turbine engine turbine rotor blade having a cooling configuration in accordance with an exemplary embodiment of the present invention.

Illustrated in FIG. 1 is an exemplary first stage turbine rotor blade 10 of a gas turbine engine, such as a turbofan aircraft engine configured for powering an aircraft in flight. The blade includes a hollow airfoil 12 and an integral dovetail 14 conventionally configured for mounting the blade in a corresponding dovetail slot in the perimeter of a turbine rotor (not shown).

The airfoil is conventionally configured for extracting energy from hot combustion gases 16 which are channeled thereover during operation for in turn rotating the rotor to power the compressor. The airfoil is hollow and receives a portion of compressor air 18 through the dovetail for cooling the blade during operation and achieving a long useful life during operation.

The airfoil 12 illustrated in FIG. 1 includes a generally concave first or pressure sidewall 20 and a circumferentially opposite, generally convex, second or suction sidewall 22. The two sidewalls are joined together at axially or chordally opposite leading and trailing edges 24,26 which extend radially or longitudinally along the radial span axis of the blade inside the turbine. The airfoil has a radially inner root 28 at the junction with a platform integrally joined to the dovetail, typically in a unitary casting therewith. The airfoil also includes a radially outer tip 30.

Figures 2, 3:
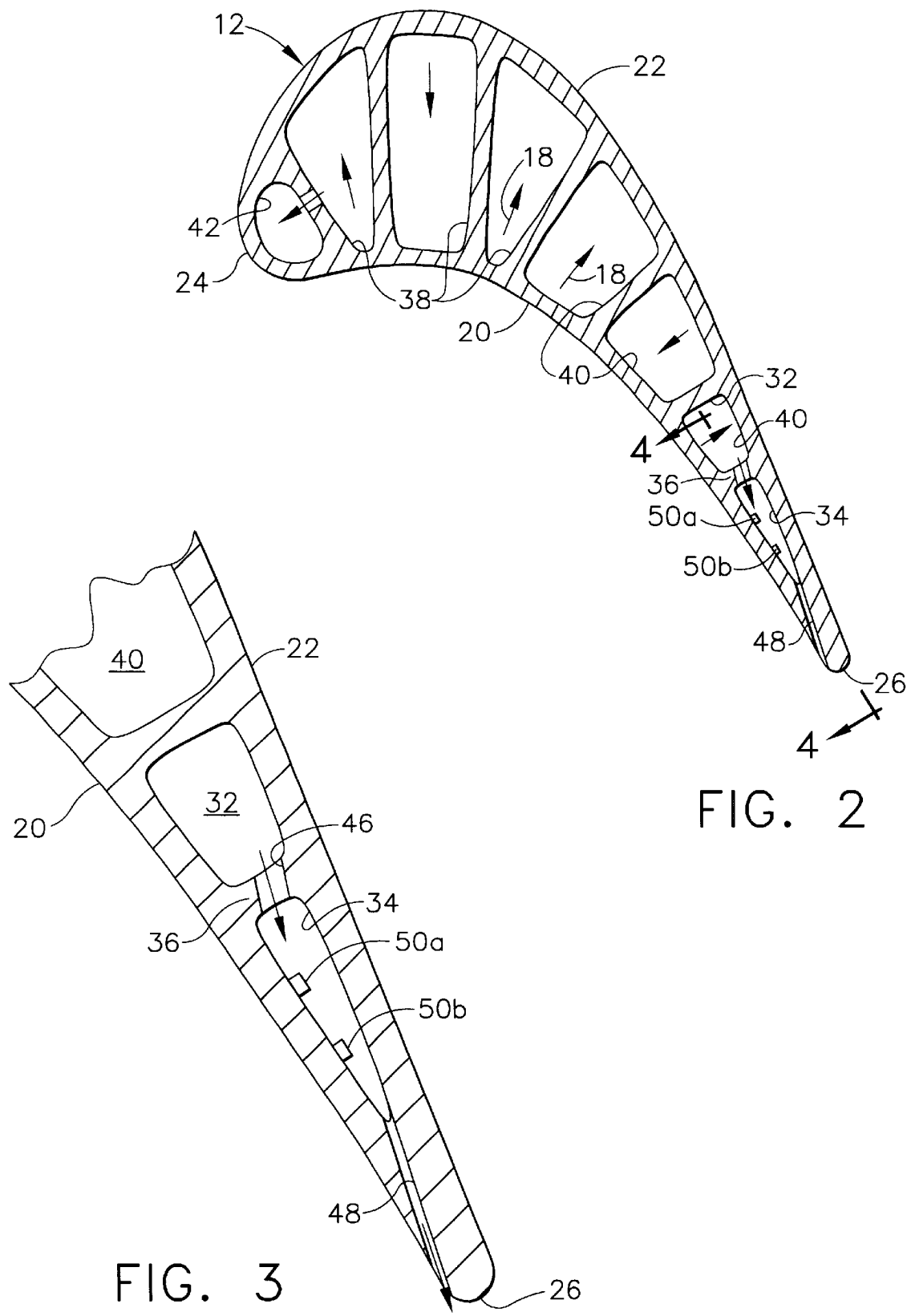
FIG. 2 is a radial sectional view through the turbine blade airfoil illustrated in FIG. 1 and taken along line 2—2.
FIG. 3 is an enlarged radial sectional view of the trailing edge region of the airfoil illustrated in FIG. 2.

As additionally shown in FIG. 2, the two sidewalls are spaced apart to define first and second longitudinally or radially extending flow channels 32,34 separated by a longitudinal septum or aft bridge 36 disposed in the trailing edge region of the airfoil. In the exemplary embodiment illustrated in FIGS. 1 and 2, additional longitudinal flow channels are disposed between the two sidewalls 20,22 forward of the first and second flow channels 32,34, and correspondingly define forward and aft serpentine flow circuits 38,40 having corresponding inlets in the dovetail illustrated in FIG. 1.

The forward serpentine circuit 38 illustrated in FIG. 1 has three passes or flow channel legs beginning near the middle of the airfoil and winding toward the airfoil leading edge which includes a dedicated leading edge flow channel 42 directly behind the leading edge. The respective radial bridges defining the channels of the forward serpentine circuit are imperforate, except for the forward-most bridge which includes a row of impingement holes for discharging the cooling air from the last pass of the forward serpentine into the leading edge cooling channel 42.

The aft serpentine circuit 40 is also a three-pass circuit in which the legs or flow channels thereof are also defined by imperforate radial bridges, with the first pass of the aft serpentine similarly receiving its inlet air near the middle of the airfoil through the dovetail.

The forward and aft serpentine circuits and leading edge cooling channel may have any conventional configuration and features, such as turbulator ribs therein as desired for increasing heat transfer effectiveness of the cooling air channeled therethrough. The pressure and suction sidewalls of the airfoil typically include various rows of film cooling holes 44 through which respective portions of the cooling air are discharged during operation for providing a cooling air film around the outer surface of the airfoil for additional protection against the hot combustion gases in a conventional manner.

In the preferred embodiment illustrated in FIGS. 1 and 2, the aft serpentine circuit 40 terminates with its last flow channel defining the first flow channel 32 for cooling the trailing edge region of the airfoil, with the air from the first channel 32 being in turn channeled or discharged into the second flow channel 34 of this trailing edge cooling circuit.

Figure 4:
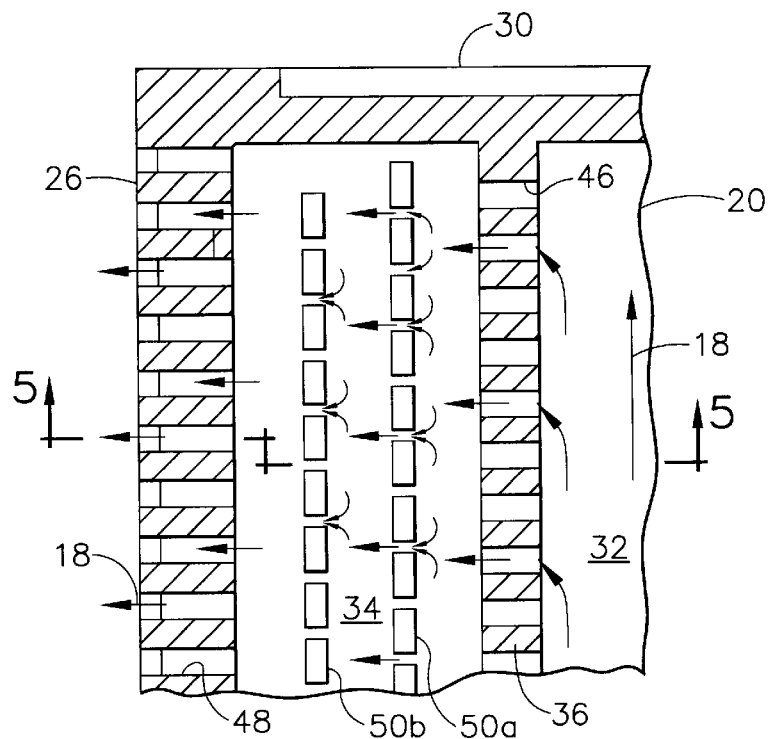
FIG. 4 is a longitudinal sectional view of a portion of the trailing edge region of the airfoil illustrated in FIG. 2 and taken along line 4—4.

More specifically, the trailing edge cooling circuit is illustrated in more particularity in FIGS. 3 and 4 and includes an array or row of inlet holes 46 extending through the aft bridge 36 to provide flow communication between the first and second channels 32,34.

A row of outlet holes 48 extends from the second channel 34 between the two sidewalls 20,22 which are integrally joined together along the trailing edge, with the outlet holes extending aft toward the trailing edge for terminating thereat.

A row of first turbulator ribs 50a is disposed inside the second channel along the inner surface of the pressure sidewall 20 and is spaced from the opposite inner surface of the suction sidewall. The first ribs 50a are longitudinally elongate as illustrated in FIG. 4, or longer than they are wide along the radial or span axis of the airfoil, and are substantially colinear in a substantially straight radial row thereof. The individual first ribs 50a are aligned in radial span and face respective ones of the inlet holes 46 for effecting crossover impingement cooling of the airfoil at their location by the cooling air 18 channeled against the ribs and thereover during operation.

As additionally shown in FIG. 4, each of the first ribs 50a is radially oriented generally parallel to the aft bridge 36 and is aligned in radial elevational with a respective one of the inlet holes 46 for being correspondingly impingement cooled by the air channeled therefrom.

Each of the first ribs 50a extends longitudinally inside the second channel 34 preferably without any significant inclination therein to orient the respective flat sides thereof substantially perpendicular to respective ones of the inlet holes for maximizing heat transfer capability of the cooling air. The individual first ribs 50a preferably extend radially without inclination inside the second flow channel, and generally parallel to the aft bridge 36, although they may have slight inclination up to about plus or minus 7 degrees relative thereto without significantly reducing the heat transfer performance thereof.

In accordance with the present invention, it is undesirable to incline the turbulator ribs in any significant amount from their radial orientation, including in particular the substantial 45–60 degree inclination of the turbulators in the Lee et al patent disclosed above. Since the Lee et al configuration is not scalable down in size for the small turbine blades for which the present invention has particular utility, the radial orientation of the turbulator ribs in accordance with the present invention functions differently, with a substantial increase in heat transfer capability as confirmed by component testing.

Figure 5:
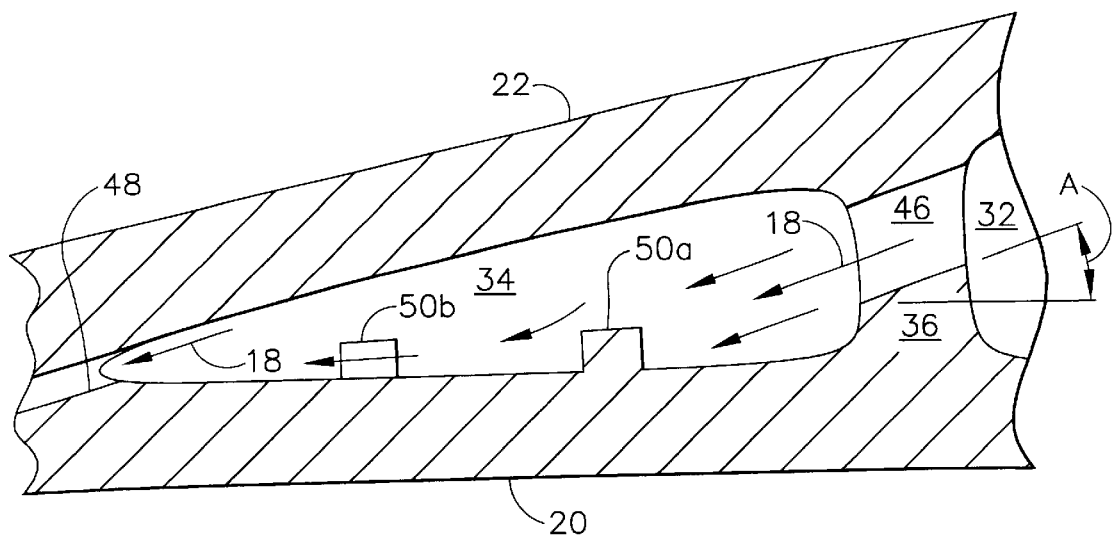
FIG. 5 is an enlarged radial sectional view through a portion of the trailing edge region illustrated in FIG. 4 and taken along line 5—5.

FIG. 5 illustrates an enlarged radial sectional view of a preferred orientation and location of the first ribs 50a inside the second channel 34. In this configuration, the inlet holes 46 are inclined through the radial plane of the aft bridge 36 toward the row of first ribs 50a with an inclination angle A of about 6 degrees. The respective first ribs 50a present upstream sides which face respective ones of the inlet holes 46 and are aligned therewith for receiving the cooling air 18 therefrom in impingement thereagainst. The individual inlet holes 46 may be sized to have a discharge spread angle of about 7 degrees to fully bathe the individual turbulator ribs around their projecting section.

Similarly, the outlet holes 48 illustrated in FIGS. 3 and 5 are also inclined through the pressure sidewall 20 toward the trailing edge 26 for producing an outlet aperture or slot along the outer surface of the pressure sidewall upstream of the trailing edge and terminating generally thereat.

In the preferred embodiment illustrated in FIGS. 1–5, the first row of first turbulator ribs 50a cooperates with a second row of second turbulator ribs 50b disposed inside the second flow channel 34 also along the inner surface of the pressure sidewall 20 and similarly spaced from the suction sidewall 22.

Like the first ribs 50a, the second ribs 50b are longitudinally elongate and substantially colinear in radial alignment along the span of the airfoil, and spaced chordally from the first row of turbulator ribs.

As shown in FIG. 4, each of the second ribs 50b preferably extends longitudinally inside the second flow channel 34 substantially parallel to the row of first turbulator ribs 50a.

The two rows of turbulator ribs 50*a,b* illustrated in FIG. 4 are similarly configured in straight radial rows, with the ribs in each row being radially spaced apart from each other. The first ribs 50*a* are thusly spaced apart longitudinally inside the second flow channel, with the second turbulator ribs 50*b* being similarly spaced apart longitudinally inside the flow channel. And, the second ribs 50*b* are preferably offset longitudinally from respective ones of the first ribs 50*a* to provide a serpentine flow path between and around the two rows of turbulator ribs from the inlet holes 46 to the outlet holes 48.

As shown in FIG. 5, the two rows of first and second ribs 50*a,b* are preferably disposed inside the second flow channel with substantially equal chordal spacing between the rows and the forward and aft ends of the second flow channel between the inlet and outlet holes. In this way, the first and second rows of turbulator ribs are disposed at about one third and two third the chordal distance inside the flow channel 34 for permitting the cooling air to firstly impinge the first ribs 50*a* and then flow over and around those ribs between the longitudinal spacings therebetween for then flowing over and around the second ribs 50*b* prior to discharge through the outlet holes 48.

Both rows of turbulator ribs 50*a,b* are thusly disposed substantially parallel to the aft bridge 36 through which the inlet holes 46 discharge the cooling air. The air then crosses over the flow channel 34 with a combination of serpentine and impingement movement over the projecting tips of the turbulator ribs and laterally around their sides between the longitudinal spaces therebetween. The colinear turbulator ribs thusly effect a substantially improved circulation of the cooling air in the relatively small and limited volume of the second flow channel 34 for maximizing the heat transfer effectiveness of the cooling area, with particular utility for small turbine blades of correspondingly low Reynolds number for the cooling air.

The inlet holes 46 illustrated in FIGS. 1 and 5 are preferably longitudinally oval and longer in the radial direction than wide in the circumferential direction between the opposite sidewalls. For example, each inlet hole may have a longitudinal height of about 45 mils (1.14 mm) and a circumferential width of about 26 mils (0.66 mm).

Correspondingly, the individual turbulator ribs 50*a,b* may have a longitudinal height of about 70 mils (1.78 mm), with a generally square sectional profile of about 20 mils (0.51 mm) on each side. And, the longitudinal gap between the ribs in each row may also be about 20 mils (0.51 mm).

In the preferred embodiment illustrated in FIG. 4, the inlet holes 46 have a pitch spacing from centerline to centerline in the longitudinal direction relative to their longitudinal height along the aft bridge 36 with a ratio thereof in the range of about 1.5 to about 3. And, in a preferred embodiment, this pitch-to-height ratio is about 2 which in accordance with component testing of the invention resulted in a heat transfer coefficient of about twice that found in the multiple impingement cooling configuration of the Lee et al patent.

This is particularly important for small blades with the first and second channels 32,34 and the inlet holes 46 being sized to effect a Reynolds number of less than about 20,000 for the cooling air discharged through the inlet holes as compared to a Reynolds number of greater than about 30,000 for the impingement cooling air in the multiple impingement configuration of the Lee et al patent large blade.

Twice the heat transfer coefficient with a substantially lower Reynolds number provides a remarkable increase in cooling effectiveness of the limited cooling air for correspondingly enhancing cooling of the trailing edge region of the relatively small turbine airfoil of the present invention. However, the invention may be applied to larger blades where practical, and where tests show the efficacy thereof as opposed to the use of the multiple impingement configuration of the Lee et al patent.

Figure 6:
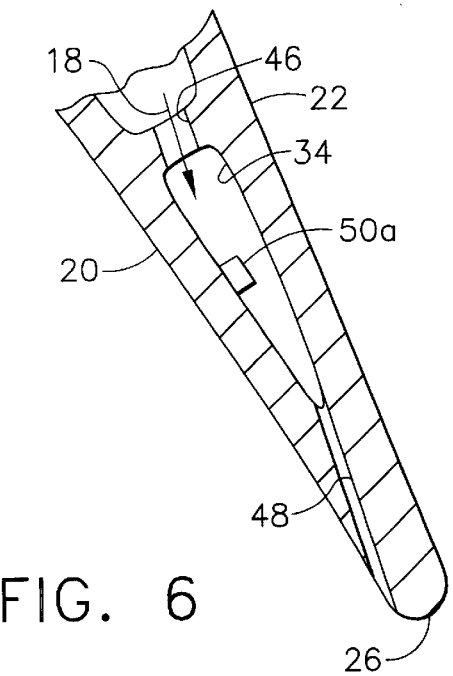
FIG. 6 is a radial sectional view, like FIG. 3, of the trailing edge region in accordance with an alternate embodiment.

Although the preferred embodiment illustrated in FIG. 5 includes two rows of the turbulator ribs 50*a,b* , a single row of the turbulator ribs 50*a* may be disposed in the second flow channel 34 as illustrated in the alternate embodiment in FIG. 6. As the size of the second flow channel 34 decreases with the relatively small turbine airfoils, a single row of the turbulator ribs may be used for effective cooling of the trailing edge region of the airfoil, with that single row being otherwise identical in configuration and orientation to the first row of turbulator ribs 50*a* disclosed in the first embodiment and illustrated in the various FIGS. 1–5.

Figure 7:
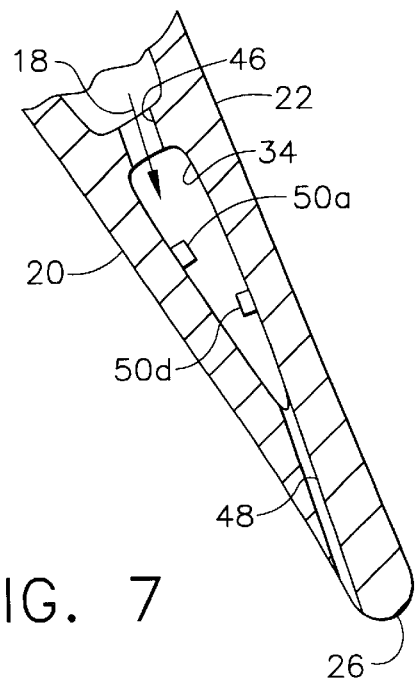
FIG. 7 is a radial sectional view, like FIG. 3, of the trailing edge region in accordance with an alternate embodiment.

FIG. 7 illustrates yet another embodiment of the invention including two rows of the turbulator ribs 50*a,d*. In this embodiment, the second row of second turbulator ribs 50*d* is disposed inside the second flow channel 34 along the inner surface of the suction sidewall 22 and spaced from the inner surface of the pressure sidewall 20 in a configuration opposite to that illustrated in FIG. 5.

However, the second ribs 50*d* may otherwise be substantially identical in configuration, orientation, and size to the second turbulators 50*b* illustrated in FIG. 5, and are therefore longitudinally elongate and substantially colinear in the same manner.

In the FIG. 7 embodiment of the invention the second ribs 50*d* are spaced chordally from the first row of ribs 50*a*, but provide alternate performance when the second flow channel 34 converges between the two sides of the airfoil toward the trailing edge 26. Since the flow channel 34 narrows between the inlet and outlet holes 46,48, less space is available for introducing the turbulator ribs, and a performance advantage may be effected by circulating the cooling air 18 over the two rows of turbulator ribs on opposite sidewalls.

The second turbulator ribs 50*d* in the FIG. 7 embodiment are longitudinally parallel to the first ribs 50*a* therein in a manner identical to that illustrated in FIG. 4, with the second ribs 50*d* being longitudinally offset from respective ones of the first ribs 50*a*. In both embodiments illustrated in FIGS. 4 and 7, the second turbulator ribs 50*b,d* are preferably centered longitudinally with the corresponding longitudinal gaps or spaces between the first turbulator ribs 50*a* in the upstream row. In this way, the cooling air channeled through the gaps between the first turbulator ribs is diverted substantially equally to flow around the corresponding downstream turbulator ribs to pass between the longitudinal gaps therebetween.

Figure 8:
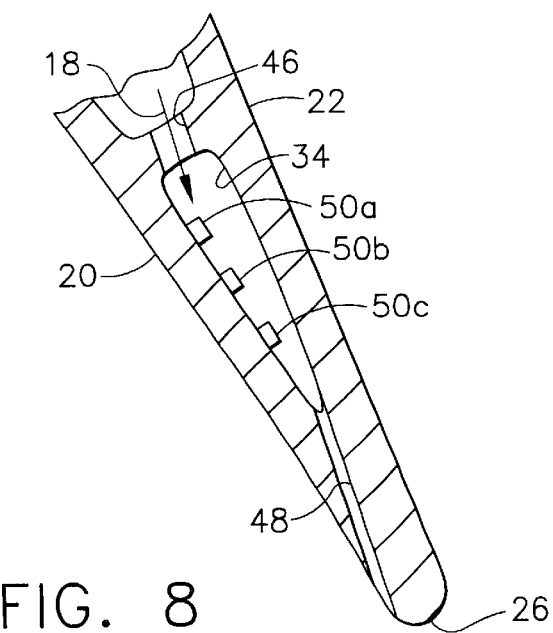
FIG. 8 is a radial sectional view, like FIG. 3, of the trailing edge region in accordance with an alternate embodiment.

FIG. 8 illustrates yet another embodiment of the invention which includes a third row of third turbulator ribs 50*c* spaced chordally between the second ribs 50*b* and the outlet holes 48. The three rows of turbulator ribs 50*a,b,c* are spaced chordally apart from each other inside the second flow channel 34 all along the inner surface of the pressure sidewall 20. Each of the three rows, including the additional row of third turbulator ribs 50*c*, has longitudinally elongate ribs therein which are substantially colinear with each other for providing three straight rows of turbulator ribs, with each row having longitudinal gaps between the ribs thereof, with the corresponding gaps in each row being preferably centered with the corresponding upstream turbulator rib.

The radially colinear turbulator ribs disclosed above occupy relatively little space in the second flow channel and are disposed substantially parallel with the aft bridge for receiving in impingement flow the cooling air discharged from the inlet holes 46 substantially normal or perpendicular to the corresponding turbulator ribs. Impingement cooling of the turbulator ribs is effected along with additional convection cooling as the impingement air is diverted laterally through the longitudinal gaps between the turbulator ribs.

One or more downstream rows of the colinear turbulator ribs may also be used in cooperation with the first or upstream row for providing additional turbulence effect on the cooling air as it flows downstream through the flow channel, with the cooling air also being diverted laterally between the longitudinal gaps of the turbulator ribs in the downstream rows.

This compact and efficient combination of features increases the heat transfer coefficient for the cooling air and thereby enhances cooling effectiveness thereof, which is particularly important for relatively small turbine blades having relatively low Reynolds numbers for the impingement cooling air. The configuration also effects more uniform cooling both longitudinally and chordally in the trailing edge region of the airfoil in which the turbulator ribs are located.

The increase in heat transfer cooling capability of the cooling air may be used to advantage for reducing the local temperature of the turbine airfoil in the trailing edge region; or, a corresponding reduction in the amount of cooling airflow may be effected for operating the turbine airfoil within a conventional temperature limit.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A turbine airfoil comprising:
   opposite pressure and suction sidewalls joined together at longitudinally extending leading and trailing edges, and spaced apart to define first and second flow channels separated by a bridge;
   a row of inlet holes extending through said bridge;
   a row of outlet holes extending from said second channel between said sidewalls toward said trailing edge; and
   a row of turbulator ribs disposed inside said second channel along said pressure sidewall and spaced from said suction sidewall, said ribs being longitudinally elongate and substantially colinear, and facing respective ones of said inlet holes for crossover impingement cooling said airfoil thereat by air channeled thereagainst.

2. An airfoil according to claim 1 wherein each of said ribs is aligned with a respective one of said inlet holes for being impingement cooled by said air channeled therefrom.

3. An airfoil according to claim 2 wherein each of said ribs extends longitudinally inside said second channel substantially perpendicular to respective ones of said inlet holes.

4. An airfoil according to claim 3 wherein said inlet holes are inclined through said bridge toward said ribs, and said outlet holes are similarly inclined through said pressure sidewall toward said trailing edge.

5. An airfoil according to claim 3 further comprising a row of second turbulator ribs disposed inside said second channel along said pressure sidewall and spaced from said suction sidewall, and said second ribs being longitudinally elongate and substantially colinear, and spaced chordally from said other row of ribs defining first ribs.

6. An airfoil according to claim 5 wherein each of said second ribs extends longitudinally inside said second channel substantially parallel to said row of first ribs.

7. An airfoil according to claim 6 wherein said first ribs are spaced apart longitudinally inside said second channel, and said second ribs are spaced apart longitudinally inside said second channel, and said second ribs are offset longitudinally from respective ones of said first ribs.

8. An airfoil according to claim 6 wherein said rows of first and second ribs are disposed inside said second channel with substantially equal chordal spacing between said rows and forward and aft ends of said second channel.

9. An airfoil according to claim 6 wherein said inlet holes are longitudinally oval.

10. An airfoil according to claim 9 wherein said inlet holes have a pitch to height ratio longitudinally along said bridge in a range of about 1.5 to 3.

11. An airfoil according to claim 10 wherein said ratio is 2.

12. An airfoil according to claim 3 comprising a single row of said ribs disposed in said second channel.

13. An airfoil according to claim 3 further comprising a row of second turbulator ribs disposed inside said second channel along said suction sidewall and spaced from said pressure sidewall, and said second ribs being longitudinally elongate and substantially colinear, and spaced chordally from said other row of ribs defining first ribs, and said second channel converges toward said trailing edge.

14. An airfoil according to claim 13 wherein said second ribs are longitudinally parallel to said first ribs, and offset longitudinally from respective ones of said first ribs.

15. An airfoil according to claim 3 further comprising three rows of said turbulator ribs spaced chordally apart from each other inside said second channel along said pressure sidewall, with each of said rows having longitudinally elongate and substantially colinear ribs.

16. A turbine airfoil comprising:
   opposite pressure and suction sidewalls joined together at longitudinally extending leading and trailing edges, and spaced apart to define first and second flow channels separated by a bridge;
   a row of inlet holes extending through said bridge;
   a row of outlet holes extending from said second channel between said sidewalls toward said trailing edge;
   a row of turbulator first ribs disposed inside said second channel along said pressure sidewall and spaced from said suction sidewall, said first ribs being longitudinally elongate and substantially colinear, and facing respective ones of said inlet holes for crossover impingement cooling said airfoil thereat by air channeled thereagainst; and
   a row of second turbulator ribs disposed inside said second channel along said pressure sidewall and spaced from said suction sidewall, and said second ribs being longitudinally elongate and substantially colinear, and spaced chordally from said row of first ribs.

17. An airfoil according to claim 16 wherein:
   each of said first ribs extends longitudinally inside said second channel substantially perpendicular to respective ones of said inlet holes; and
   each of said second ribs extends longitudinally inside said second channel substantially parallel to said row of first ribs.

18. An airfoil according to claim 17 wherein:

said first ribs are spaced apart longitudinally inside said second channel, and said second ribs are spaced apart longitudinally inside said second channel, and said second ribs are offset longitudinally from respective ones of said first ribs;

said inlet holes are longitudinally oval; and each of said first ribs is aligned with a respective one of said inlet holes for being impingement cooled by said air channeled therefrom.

19. An airfoil according to claim 18 wherein said inlet holes have a pitch to height ratio longitudinally along said bridge in a range of about 1.5 to 3.

20. An airfoil according to claim 18 further comprising additional longitudinal flow channels disposed between said pressure and suction sidewalls forward of said first and second channels, and defining forward and aft serpentine flow circuits, with said aft circuit terminating in said first channel for channeling said cooling air thereto for discharge into said second channel.

21. An airfoil according to claim 18 wherein said first and second channels and inlet holes are sized to effect a Reynolds number of less than about 20,000 for said air discharged through said inlet holes.

22. An airfoil according to claim 18 further comprising a row of third turbulator ribs spaced chordally between said second ribs and said outlet holes, along said pressure sidewall, and said third ribs being longitudinally elongate and substantially colinear.

* * * * *